(12) United States Patent
Chen et al.

(10) Patent No.: US 11,557,820 B2
(45) Date of Patent: Jan. 17, 2023

(54) PHASE SHIFTER HAVING A SUBSTRATE WITH A SIGNAL FEED LINE THEREON AND INCLUDING A REPLACEABLE DIELECTRIC BOARD FIXED TO THE SUBSTRATE AND COVERING THE FEED LINE

(71) Applicant: CommScope Technologies LLC, Hickory, NC (US)

(72) Inventors: Haiyan Chen, Suzhou (CN); Fangwen Wan, Suzhou (CN); Hangsheng Wen, Suzhou (CN); Yan Wang, Suzhou (CN); Fan He, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 84 days.

(21) Appl. No.: 17/238,498

(22) Filed: Apr. 23, 2021

(65) Prior Publication Data

US 2021/0367313 A1    Nov. 25, 2021

(30) Foreign Application Priority Data

May 22, 2020    (CN) .......................... 202010439311.3

(51) Int. Cl.
*H01P 1/18*    (2006.01)
*H04W 88/08*    (2009.01)

(52) U.S. Cl.
CPC ................ *H01P 1/184* (2013.01); *H01P 1/18* (2013.01); *H01P 1/182* (2013.01); *H04W 88/08* (2013.01)

(58) Field of Classification Search
CPC ............... H01P 1/184; H01P 1/18; H01P 9/00
USPC ........................................................... 333/161
See application file for complete search history.

(56) References Cited

U.S. PATENT DOCUMENTS

| | | | | |
|---|---|---|---|---|
| 3,440,573 | A | * 4/1969 | Butler | H01P 1/184 333/156 |
| 2003/0016097 | A1 | * 1/2003 | McKinzie, III et al. | H01Q 3/2682 333/161 |
| 2010/0073105 | A1 | * 3/2010 | Chang et al. | H01P 1/184 333/136 |
| 2012/0056692 | A1 | * 3/2012 | Moon et al. | H01Q 3/26 333/136 |
| 2014/0232484 | A1 | * 8/2014 | Sakasai et al. | H01P 1/184 333/161 |
| 2015/0116180 | A1 | * 4/2015 | Wu | H01P 1/184 333/139 |

* cited by examiner

*Primary Examiner* — Benny T Lee
(74) *Attorney, Agent, or Firm* — Myers Bigel, P.A.

(57) ABSTRACT

A phase shifter includes: an input port configured to receive a radio frequency signal; an output port configured to output a radio frequency signal whose phase is changed; The output port and changing the phase of the radio frequency signal; and a replaceable dielectric board made of dielectric material and covering at least a part of the feed line.

17 Claims, 8 Drawing Sheets

PHASE SHIFTER HAVING A SUBSTRATE WITH A SIGNAL FEED LINE THEREON AND INCLUDING A REPLACEABLE DIELECTRIC BOARD FIXED TO THE SUBSTRATE AND COVERING THE FEED LINE

CROSS-REFERENCE TO RELATED APPLICATION

The present application claims priority to Chinese Patent Application No. 202010439311.3, filed May 22, 2020, the entire content of which is incorporated herein by reference as if set forth fully herein.

FIELD

The present disclosure relates to a phase shifter.

BACKGROUND

A phase shifter is a device that can adjust the phase of a radio frequency (RF) signal. Some phase shifters operate to change the phase of an RF signal by transmitting an RF signal into a medium and then changing the electrical length of the path that the RF signal traverses as it passes through the medium. The phase of the RF signal may be changed, for example, by changing the physical length of the path that the radio signal traverses as it passes through the medium or by changing a property of the medium (such as the dielectric constant of the RF transmission line within the medium).

SUMMARY OF THE INVENTION

In one aspect of the present disclosure, there is provided a phase shifter, including an input port configured to receive a radio frequency (RF) signal; an output port configured to output the RF signal with a changed phase; a feed line configured to transmit the RF signal from the input port to the output port and change the phase of the RF signal; and a replaceable dielectric board made of a dielectric material and configured to cover at least a part of the feed line.

In some embodiments of the present disclosure, the phase shifter includes a plurality of the dielectric boards, and different dielectric boards cover different amounts of the feed line.

In some embodiments of the present disclosure, the dielectric materials of the plurality of dielectric boards have different dielectric constants.

In some embodiments of the present disclosure, the plurality of dielectric boards have different thicknesses.

In some embodiments of the present disclosure, the plurality of dielectric boards have different sizes.

In some embodiments of the present disclosure, the phase shifter includes a substrate carrying the feed line, and the dielectric board is fixed to the substrate by riveting or screwing.

In another aspect of the present disclosure, there is provided a phase shifter, including: a substrate; an input port configured to receive a radio frequency (RF) signal; an output port configured to output the RF signal with a changed phase; a feed line on the substrate configured to transmit the RF signal from the input port to the output port and change the phase of the RF signal; and a replaceable dielectric board which is made of a dielectric material and includes a first surface and a second surface opposite to the first surface, wherein the feed line includes a first feed line, a second feed line and a third feed line that are not connected to one another, the second feed line is located on the second surface of the dielectric board, and the dielectric board is provided on the substrate so that the first surface of the dielectric board is adjacent to the first feed line and the third feed line, two ends of the second feed line are coupled to the first feed line and the third feed line respectively.

In some embodiments of the present disclosure, the dielectric materials of different dielectric boards have different dielectric constants.

In some embodiments of the present disclosure, the dielectric board is fixed to the substrate by riveting or screwing.

In some embodiments of the present disclosure, the lengths of the second feed lines on different dielectric boards are different.

In some embodiments of the present disclosure, the second feed line is a periodic curve and contains at least one period of the periodic curve.

In some embodiments of the present disclosure, the periodic curve includes a sine curve and a square wave curve.

In a further aspect of the present disclosure, there is provided a base station comprising the above phase shifter.

In a further aspect of the present disclosure, there is provided a method of changing the amount of electronic downtilt applied to an antenna beam generated by an array of radiating elements, the method comprising: replacing a first dielectric board of a phase shifter of the antenna with a second dielectric board.

In some embodiments of the present disclosure, the phase shifter includes a microstrip transmission line segment that includes a feed line and a ground plane, and wherein the second dielectric board is positioned over the feed line so that the feed line is between the dielectric board and the ground plane.

In some embodiments of the present disclosure, the first and second dielectric boards have different dielectric constants.

In some embodiments of the present disclosure, the first and second dielectric boards are configured to cover different lengths of a transmission line segment of the phase shifter.

In some embodiments of the present disclosure, the first dielectric board includes a first trace segment and the second dielectric board includes a second trace segment that has a different electrical length than the first trace segment.

In some embodiments of the present disclosure, the first and second trace segments are each configured to capacitively couple to a pair of transmission line segments of the phase shifter.

In some embodiments of the present disclosure, the phase shifter includes a first transmission line segment and a second transmission line segment, and wherein the first dielectric board includes a third transmission line segment and the second dielectric board includes a fourth transmission line segment.

In some embodiments of the present disclosure, the third transmission line segment is configured to electrically connect the first transmission line segment to the second transmission line segment when the first dielectric board is included in the phase shifter, and the fourth transmission line segment is configured to electrically connect the first transmission line segment to the second transmission line segment when the second dielectric board is included in the phase shifter.

Figure 1:
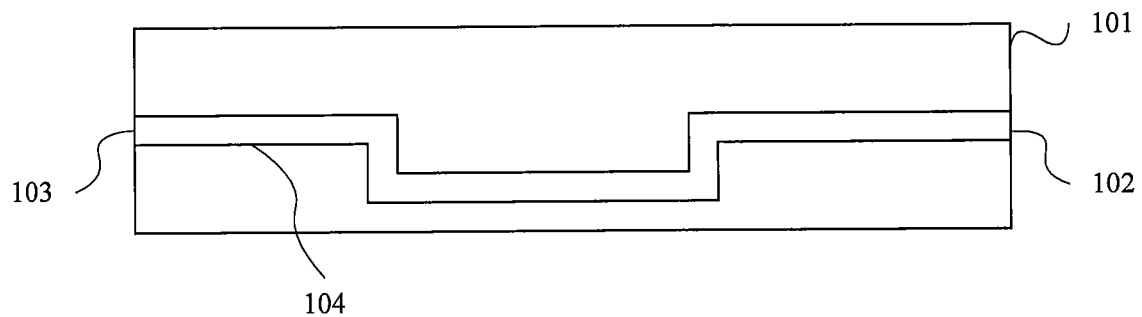
FIG. 1 is a schematic diagram of certain elements of a phase shifter according to exemplary embodiments of the present disclosure.

Note that, in the embodiments described below, the same reference numbers are commonly used between different drawings to indicate the same components or components having the similar function, and repeated description thereof is omitted. In some cases, similar reference numbers and letters are used to denote similar items, so once an item is defined in one drawing, there is no need to discuss it further in subsequent drawings.

For ease of understanding, the position, size, and range of each structure shown in the drawings and the like may not indicate the actual position, size, and range. Therefore, the present disclosure is not limited to the positions, sizes, ranges, etc. disclosed in the drawings and the like.

DETAILED DESCRIPTION OF THE INVENTION

Various exemplary embodiments of the present disclosure will be described in detail below with reference to the drawings. It should be noted that the relative arrangement of components and steps, numerical expressions, and numerical values set forth in these embodiments do not limit the scope of the present disclosure unless specifically stated otherwise.

The following description of at least one exemplary embodiment is actually merely illustrative, and in no way serves as any limitation to the application or use of embodiments of the present disclosure. That is, the structures and methods herein are shown in an exemplary manner to illustrate different embodiments of the structures and methods in the present disclosure. However, those skilled in the art will understand that the different embodiments described herein only illustrate exemplary ways of implementing the present disclosure, not exhaustively. In addition, the drawings are not necessarily drawn to scale, and some features may be exaggerated to show details of specific components.

Techniques, methods and equipment known to those of ordinary skill in the related art may not be discussed in detail, but where appropriate, the techniques, methods and equipment should be considered as part of the specification.

In all examples shown and discussed herein, any specific value should be interpreted as merely exemplary and not limiting. Therefore, other examples of the exemplary embodiment may have different values.

Modern base station antennas include one or more arrays of radiating elements. Each array of radiating elements may generate one or more radiation patterns (also called antenna beams). In order to change the tilt (elevation) angle of the antenna beam generated by an array of radiating elements, most modern base station antennas include a phase shifter that is interposed along the RF transmission path between a radio that is connected to the antenna and the array of radiating elements, along with a driving device (typically referred to as a remote electronic tilt or "RET" actuator). The phase shifter splits the RF signal into a plurality of sub-components, and injects a different amount of phase shift (i.e., a phase taper) to each of the sub-components of the RF signal. The phase shifted sub-components of the RF signal are passed to respective radiating elements (or groups of radiating elements) of the array. The phase taper applied to the sub-components of the RF signal acts to electronically change the tilt angle of the antenna beam formed by the array of radiating elements. The driving device may be used to adjust how much of a phase taper the phase shifter imparts to the sub-components of the RF signal, and hence how much the tilt angle is adjusted. This technique may be used, for example, to adjust the size of the region or "cell" covered by the base station antenna. Unfortunately, however, the size of many small cell base stations does not provide sufficient room to accommodate a conventional phase shifter along with the driving device thereof. A cellular operator will often require that a small cell base station antenna be configured to impart a certain amount of electronic tilt to the RF signals that radiated by the antenna. One way of achieving this tilt is to design the antenna to impart the specified amount of electronic downtilt to the radiation patterns generated by the array of radiating elements. This can be accomplished, for example, by building a fixed amount of phase shift into the RF transmission lines that feed the radiating elements of the array. However, different application scenarios require different amounts of electronic tilt, and thus it is necessary to design different versions of each base station antenna for each potential application scenario, which increases the development cycle and design costs.

Figure 2:
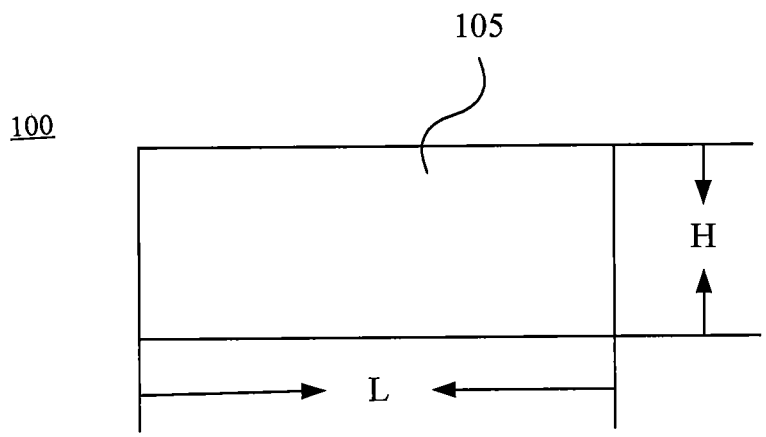
FIG. 2 is a schematic diagram of a dielectric board according to exemplary embodiments of the present disclosure that may be used in the phase shifter of FIG. 1.
Figure 3:
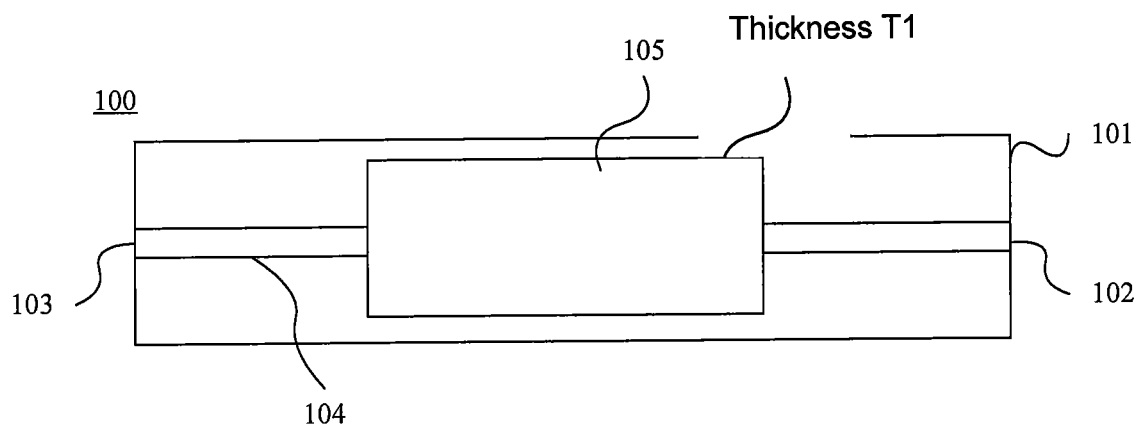
FIG. 3 is a schematic diagram of a first configuration of the phase shifter of FIG.

FIGS. 1-3 are schematic diagrams of a phase shifter according to an embodiment of the present disclosure. As shown in FIG. 1, the phase shifter 100 includes a substrate 101, an input port 103, an output port 102, and a feed line 104 on the substrate 101. RF signals may be input to the phase shifter 100 at the input port 103, transmitted to the output port 102 via the feed line 104, and output at the output port 102. During transmission through the feed line 104, the phase of the RF signal changes.

Figure 4:
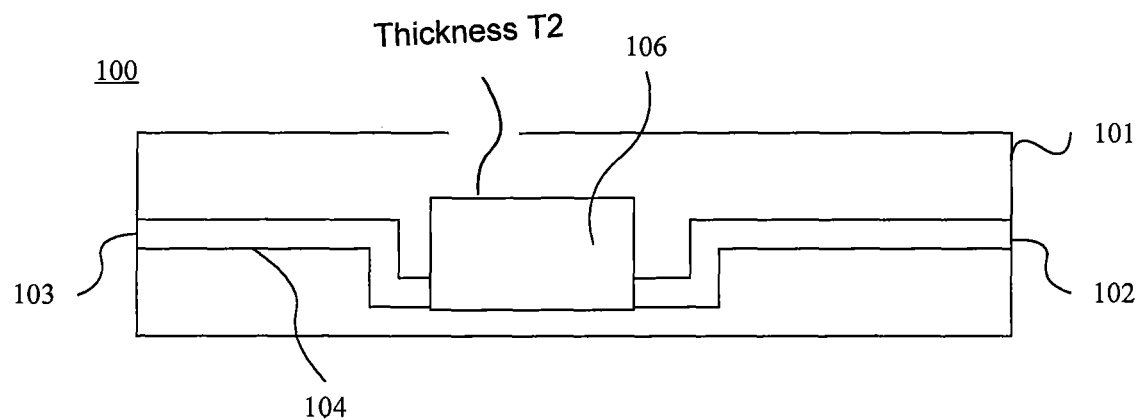
FIG. 4 is a schematic diagram of a second configuration of the phase shifter according of FIG. 1.

As shown in FIG. 2, the phase shifter 100 further includes a replaceable dielectric board 105. The dielectric board 105 is made of a dielectric material, such as a printed circuit board made of FR4, etc. The size (e.g., the length L, width H and thickness) and dielectric constant of the dielectric board 105 can be selected according to actual needs. For example, in some embodiments according to the present disclosure, a small dielectric board 105 may be used that only covers a portion of the feed line 104 as in FIG. 3, or the dielectric board 105 may cover the entire feed line 104. That is, according to the embodiment of the present disclosure, the dielectric board 105 covers at least a part of the feed line 104. As shown in FIGS. 3 and 4, dielectric board 105 may have a first thickness T1 and dielectric board 106 may have a second thickness T2 that is different from the first thickness T1.

As shown in FIG. 3, in the phase shifter 100, the dielectric board 105 covers a part of the feed line 104. The electrical length of an RF transmission line and the frequency of an RF signal that is input to the RF transmission line determine how much the phase of the RF signal will change as the RF signal traverses the RF transmission line. The electrical length of a microstrip or stripline transmission line is a function of, among other things, the dielectric constant of the dielectric material that surrounds the feed line 104. Portions of the feed line 104 that are not covered by dielectric board 105 are "covered" by air, which has a dielectric constant of 1. Other portions of the feed line 104 that are covered by the dielectric board 105 are covered by a dielectric material having a dielectric constant greater than 1. As such, for a dielectric board 105 having a constant dielectric constant, the amount of phase shift imparted to an RF signal traversing the feed line 104 will be a function of the portion of the feed line 104 that is covered by the dielectric board 105. Thus, the amount of phase shift imparted by phase shifter 100 may be changed by changing the size of the replaceable dielectric board 105. Additionally, the amount of phase shift can also be changed by changing the dielectric constant of the dielectric board 105. Therefore, as shown in FIG. 4, according to the design requirements of the phase shifter, different phase shifts may be imparted to an RF signal by simply replacing a first dielectric board 105 with a different dielectric board 106 that has a different size and/or dielectric constant, without changing the substrate 101, the input port 103, the output port 102, and the feed line 104.

Figure 5:
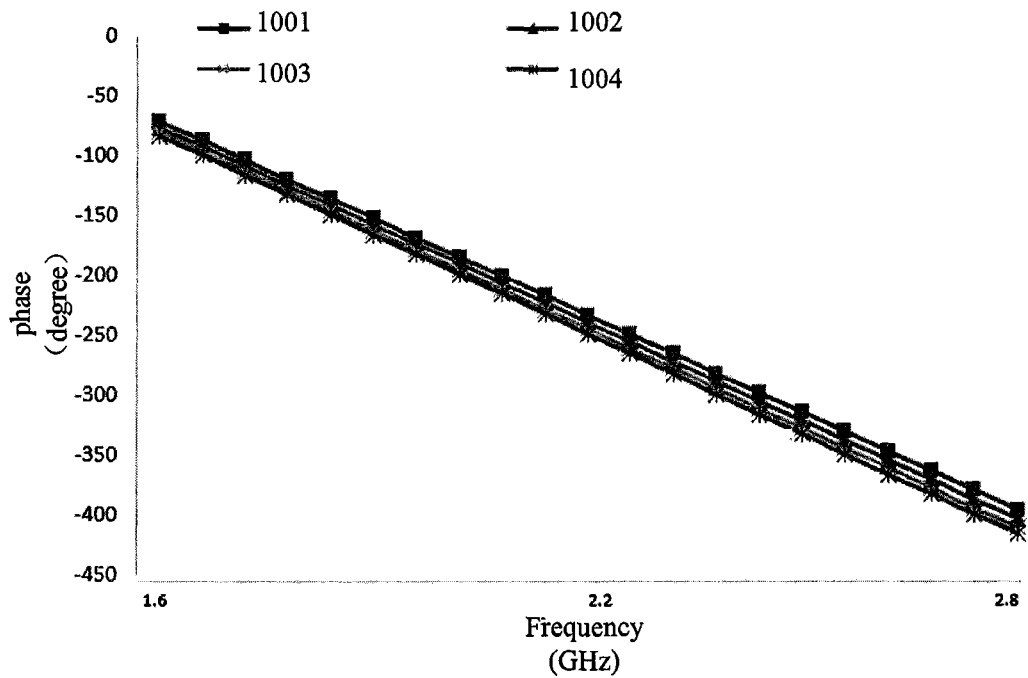
FIG. 5 is a diagram showing the phase of RF signals output by the phase shifter of FIG. 1 when configured in several different ways.

FIG. 5 is a diagram showing the phase (in degrees) of the RF signal of the phase shifter 100 as a function of frequency (in GHz) according to an embodiment of the present disclosure as a function of the dielectric constant of different dielectric boards which may be used in the phase shifter 100. In the example of FIG. 5, all the dielectric boards 105 have the same size, but include dielectric materials having different dielectric constants. The curve 1001 corresponds to the case where no dielectric board 105 is provided, curve 1002 corresponds to the case where the dielectric constant of the dielectric board 105 is equal to 2.94, curve 1003 corresponds to the case where the dielectric constant of the dielectric board 105 is equal to 5.8, and curve 1004 corresponds to the case where the dielectric constant of the dielectric board 105 is equal to 9.2.

As shown in FIG. 5, assuming that the center frequency of the RF signal is 2.2 GHz as an example, when the phase shifter 100 does not include the dielectric board 105, the phase of the output signal is equal to −233.5°; when the dielectric constant of the dielectric board 105 is equal to 2.94, the phase of the output signal is −239.7°; when the dielectric constant of the dielectric board 105 is equal to 5.8, the phase of the output signal is −245.2°; when the dielectric constant of the dielectric board 105 is equal to 9.2, the phase of the output signal is −249.5°.

It can be seen from FIG. 5 that as the dielectric constant of the dielectric board 105 increases, the absolute value of the phase of the output RF signal gradually increases. Therefore, the phase shifter 100 according to embodiments of the present disclosure may provide different phase shifts by simply changing the parameters (e.g., size, dielectric constant, etc.) of the dielectric board 105 that covers the feed line 104.

Figure 6:
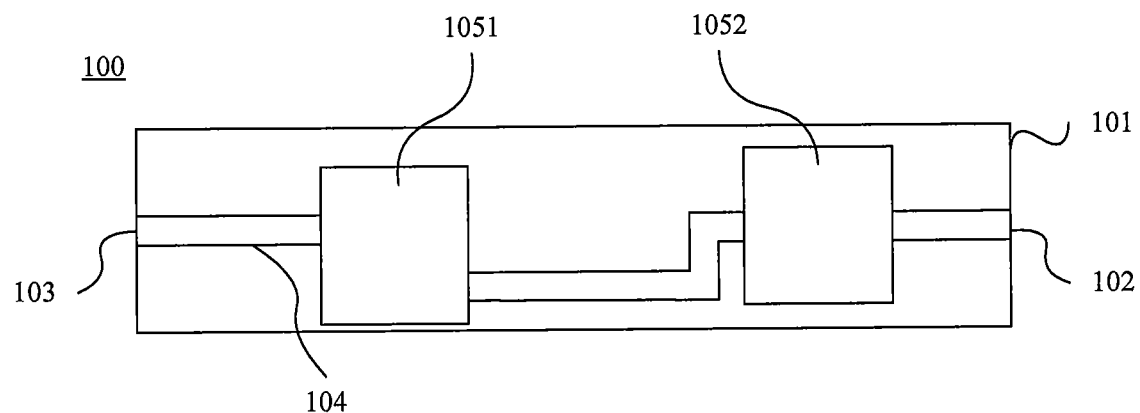
FIG. 6 is a schematic diagram of the phase shifter of FIG. 1 configured to have two dielectric boards.

In addition, in some embodiments according to the present disclosure, a plurality of dielectric boards may be included in the phase shifter. FIG. 6 shows another embodiment of the phase shifter 100 that includes both a first dielectric board 1051 and a second dielectric board 1052. The two dielectric boards may be arranged on different parts of the feed line 104 according to actual needs. In some small base stations with limited space, the use of multiple dielectric boards can increase the design flexibility, and flexibly set the dielectric boards according to the locations of other components in the base station.

Figure 7:
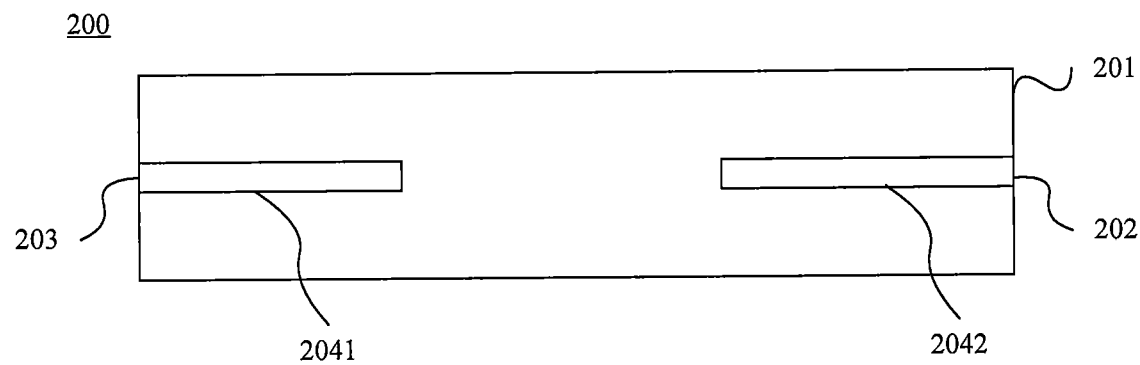
FIG. 7 is a schematic diagram of a phase shifter according to further embodiments of the present disclosure.

FIG. 7 is a schematic diagram of a phase shifter 200 according to another embodiment of the present disclosure. As shown in FIG. 7, the phase shifter 200 includes a substrate 201, an input port 203, an output port 202, a feed line 2041 and a feed line 2042.

An RF signal may be input to the phase shifter 200 at the input port 203, and transmitted to the output port 202 via the feed line 2041 and the feed line 2042. However, the feed line 2041 and the feed line 2042 are not electrically connected to each other.

Figure 16:
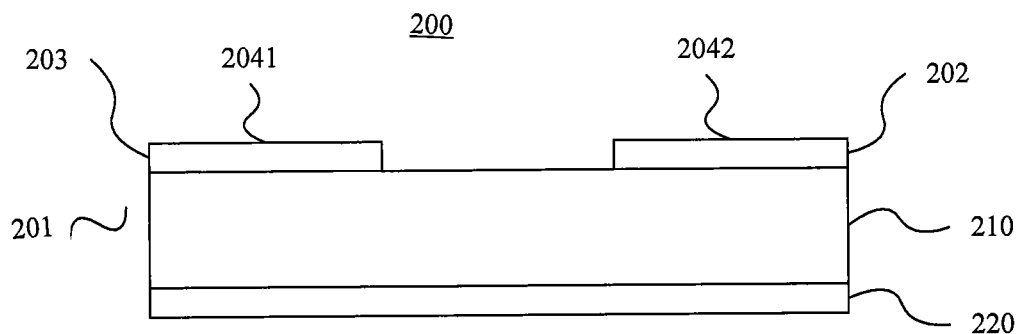
FIG. 16 is a cross section of the phase shifter of FIG. 7.

FIG. 16 is a cross section of the phase shifter 200 of FIG. 7. As shown in FIG. 16, the substrate 201 of the phase shifter 200 includes a layer of dielectric material 210 and a ground plane 220. The ground plane 220 and the feed line 2041, 2042 (also called transmission line, micro strip, or trace) are formed on opposite sides of the layer of dielectric material 210.

Figure 8:
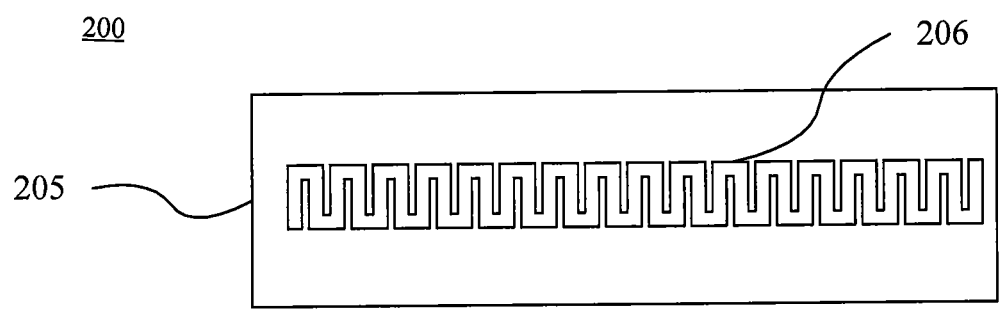
FIG. 8 is a schematic diagram of a dielectric board according to one or more exemplary embodiments of the present disclosure.

In addition, as shown in FIG. 8, the phase shifter 200 further includes a replaceable dielectric board 205. A feed line 206 is provided on the dielectric board 205. The dielectric board 205 is made of a dielectric material, such as a printed circuit board made of FR4, etc. The size parameters (such as the length, width, and thickness) and dielectric constants of the dielectric board 205 can be selected according to actual needs.

In addition, the shape and length of the feed line 206 can be selected according to actual needs. In the embodiment shown in FIG. 8, the shape of the feed line 206 is a square wave. In addition, the shape of the feed line 206 is not limited, and in some embodiments according to the present disclosure, the shape of the feed line 206 may be a periodic curve such as a sine wave, or other shapes, or even a straight line.

Figure 9:
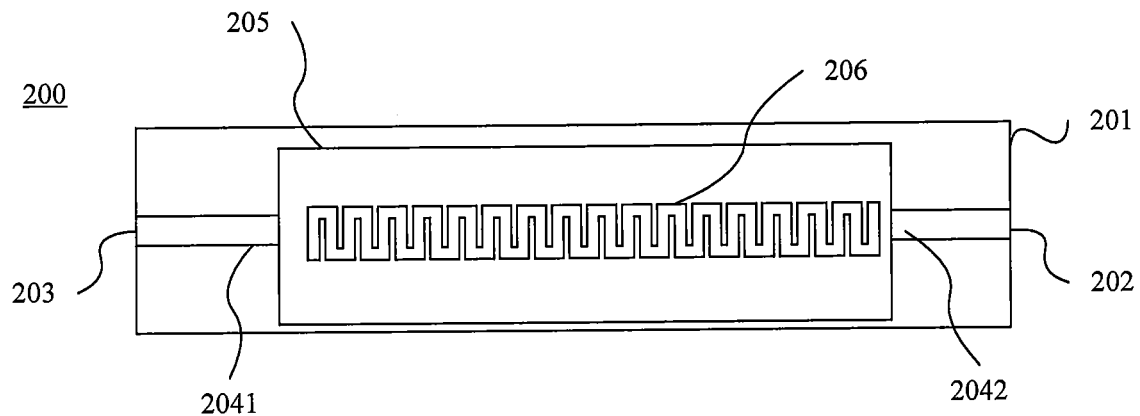
FIG. 9 is a schematic diagram of the phase shifter of FIG. 7 with the dielectric board of FIG. 8 mounted thereon.
Figure 17:
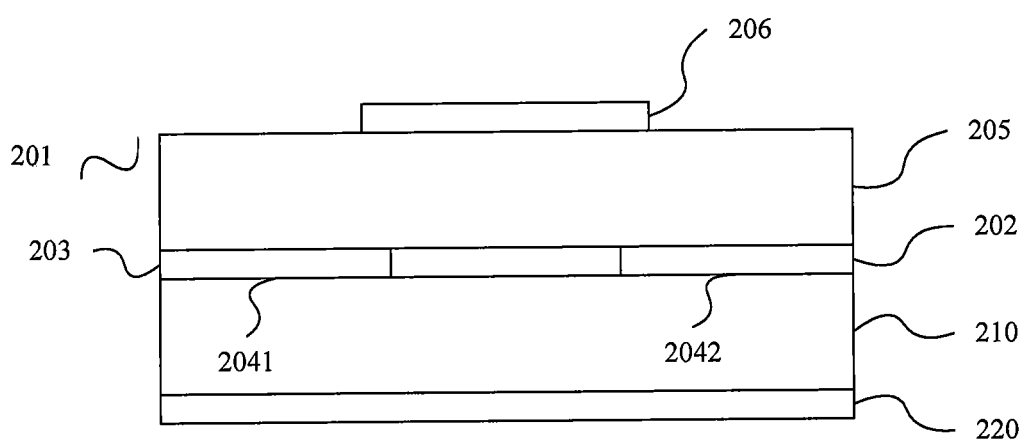
FIG. 17 is a cross section of the phase shifter of FIG. 7, with the dielectric board of FIG. 8 installed thereon.

FIG. 9 is a schematic diagram of the phase shifter 200 of FIG. 7 with the replaceable dielectric board 205 of FIG. 9 mounted thereon. FIG. 17 is a cross section, along the horizontal direction, of the phase shifter of FIG. 7, with the replaceable dielectric board 205 installed thereon. In FIG. 17, the cross section of the feed line 206 on the dielectric board 205 is simplified as a straight line. However, it should be understood that in case the feed line 206 is in the shape of a square wave, the cross section along the horizontal direction is actually a plurality of section of traces. The dielectric board 205 includes two surfaces, that is, a second surface provided with the feed line 206 and a first surface opposite to the second surface. The first surface of the dielectric board 205 faces the feed line 2041 and the feed line 2042 on the substrate 201, that is, the first surface of the dielectric board 205 is adjacent to the feed line 2041 and the feed line 2042. In this way, the two ends of the feed line 206 located on the second surface of the dielectric board 205 can be coupled to the feed line 2041 and the feed line 2042, respectively. The RF signal received from the input port 203 may be sequentially transmitted to the output port 202 via the feed line 2041, the feed line 206, and the feed line 2042. During the transmission of the RF signal, the phase of the RF signal changes. In this way, a RF signal whose phase is changed is output from the output port 202.

When the design requirements of the phase shifter 200 change, the substrate 201, the input port 203, the output port 202, and the feed line 2041 are kept unchanged. The phase shift of the output RF signal changes by replacing the dielectric board 205 with different feed line 206, and the new design requirements are met. In this way, design cost and design time can be reduced.

Figure 10:
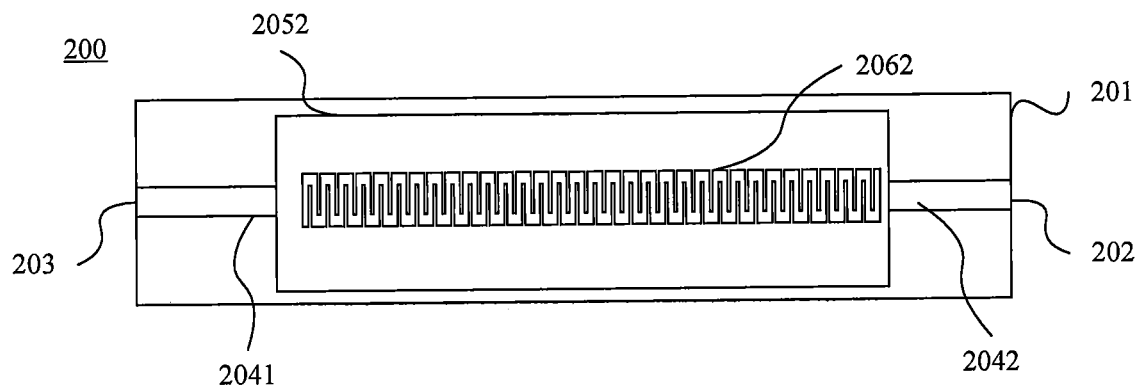
FIG. 10 is a schematic diagram of the phase shifter of FIG. 7 with a different dielectric board mounted thereon.

For example, FIG. 10 shows a schematic diagram of a phase shifter according to an embodiment of the present disclosure. As shown in FIG. 10, the dielectric board 205 of the phase shifter 200 has been replaced. On the new dielectric board 2052, a feed line 2062 with a larger length is provided, that is, the transmission path of the RF signal becomes longer. Thus, different amounts of phase shift can be achieved.

Figure 11:
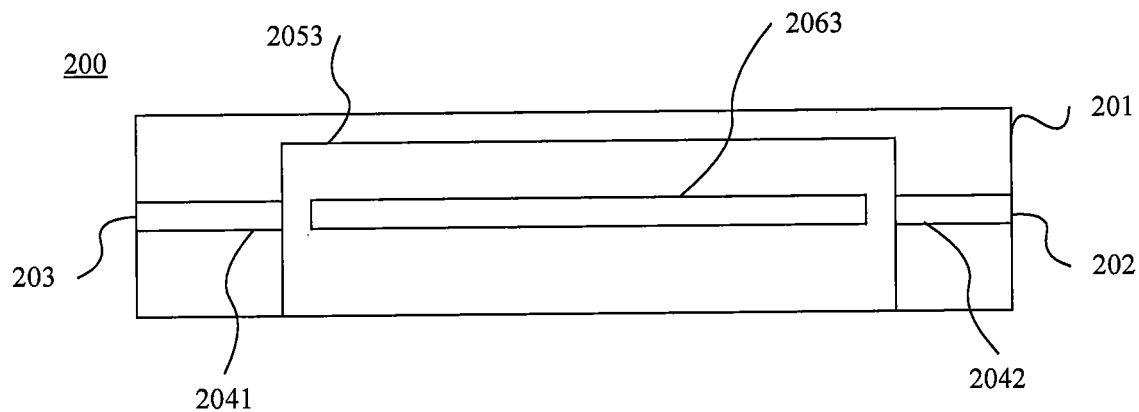
FIG. 11 is a schematic diagram of a phase shifter according to exemplary embodiments of the present disclosure.
Figure 12:
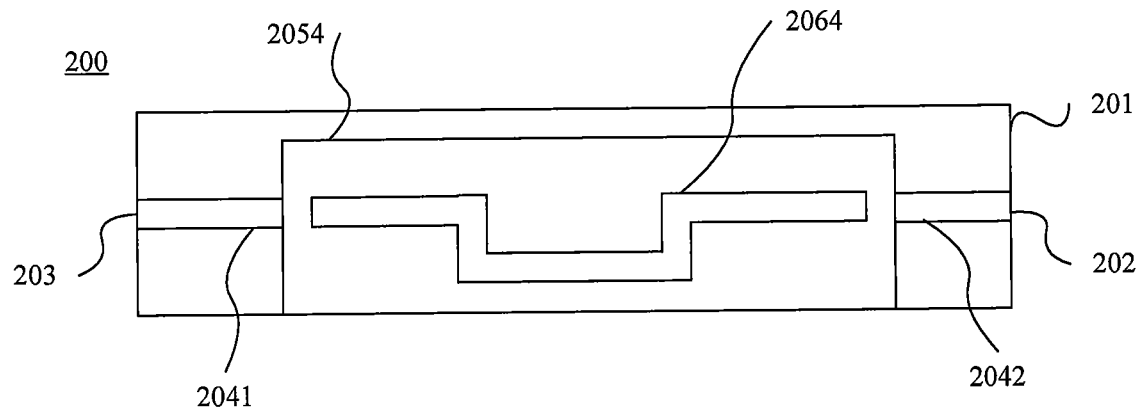
FIG. 12 is a schematic diagram of a phase shifter according to exemplary embodiments of the present disclosure.
Figure 13:
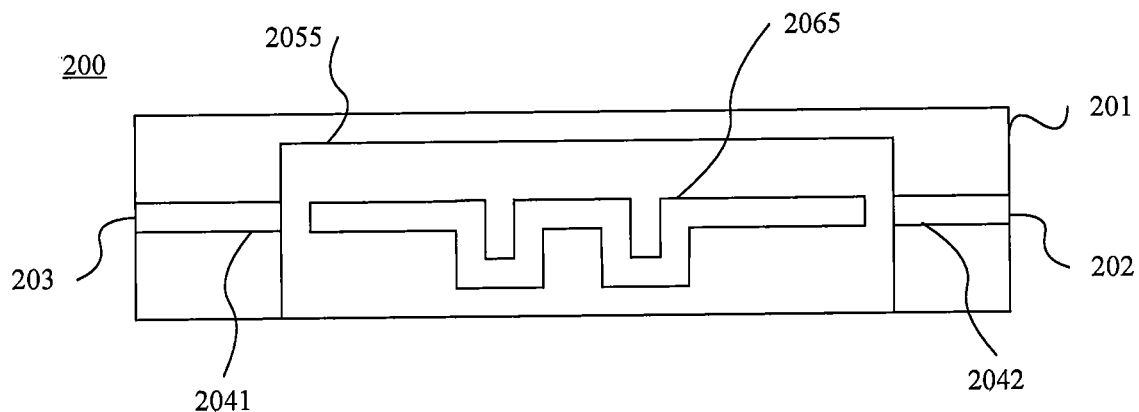
FIG. 13 is a schematic diagram of a phase shifter according to one or more exemplary embodiments of the present disclosure.

FIGS. 11-13 are schematic diagrams of a phase shifter according to additional embodiments of the present disclosure. In the phase shifter 200, dielectric boards 2053 (FIG. 11), 2054 (FIG. 12), and 2055 (FIG. 13) are provided, respectively. The three dielectric boards have the same size and are made of the same dielectric material, but the feed lines on the dielectric boards are different. As shown in FIG. 11, the feed line 2063 on the dielectric board 2053 is a straight line. As shown in FIG. 12, the feed line 2064 on the dielectric board 2054 is in the form of a square wave and contains one trough. As shown in FIG. 13, the feed line 2065 on the dielectric board 2055 is in the form of a square wave and contains two troughs. The influence of these three kinds of dielectric boards on the phase of the RF signal is shown in FIG. 14, which is a graph of phase (in degrees) versus frequency (in GHz).

Figure 14:
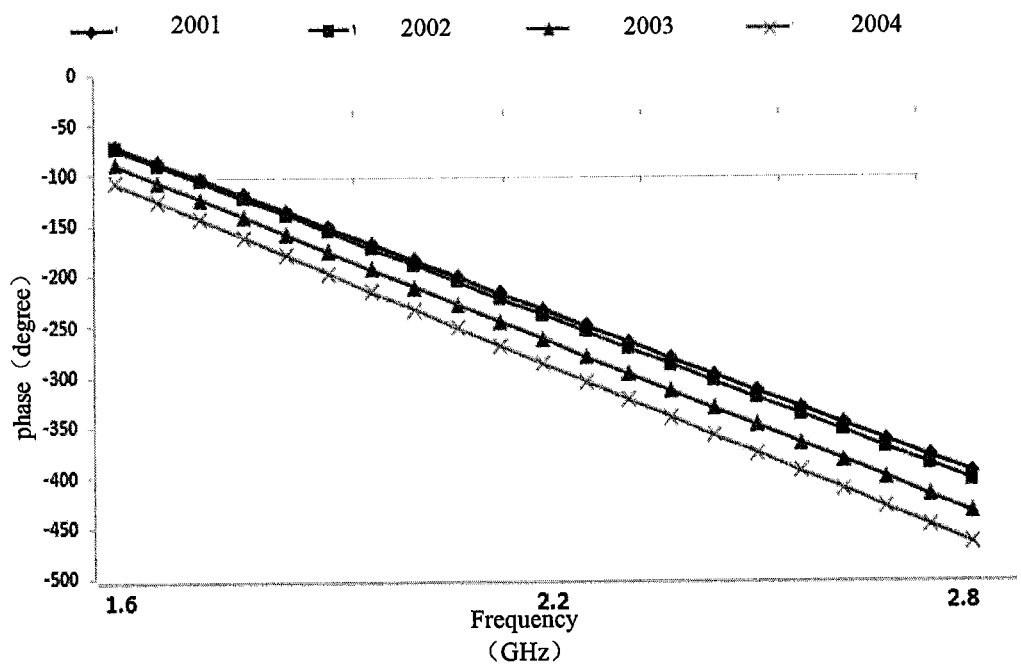
FIG. 14 is a diagram showing the phase of a radio frequency signal output by a phase shifter according to one or more exemplary embodiments of the present disclosure.

In FIG. 14, the curve 2002 corresponds to the dielectric board 2053, the curve 2003 corresponds to the dielectric board 2054, and the curve 2004 corresponds to the dielectric board 2055. As shown in FIG. 14, assuming that center frequency of the RF signal is 2.2 GHz, when the dielectric board 2053 is provided in the phase shifter 200, the phase of the RF signal output by the phase shifter 200 is −239°; when the dielectric board 2054 is provided in the phase shifter 200, the phase of the RF signal output by the phase shifter 200 is −263°; and when the dielectric board 2055 is provided in the phase shifter 200, the phase of the RF signal output by the phase shifter 200 is −288°.

In addition, FIG. 14 also shows the phase of the RF signal output by the phase shifter 200 (that is, curve 2001) when no dielectric board is provided. It should be understood that the absence of a dielectric board here refers to the case where the feed line 2041 and the feed line 2042 of the phase shifter 200 are directly electrically connected.

It can be seen from above that the amount of phase shift of the phase shifter 200 on the RF signal can be changed by providing feed lines 206 with different shapes and lengths in the phase shifter 200. For small wireless communication base stations with limited internal space, the size of the phase shifter can be reduced, the internal space can be fully utilized, and a variable tilt angle can be achieved.

In addition, with the phase shifter 200 according to the embodiment of the present disclosure, other negative effects such as passive intermodulation (PIM), return loss (Return Loss), isolation (Isolation), etc. will not be introduced.

Figure 15:
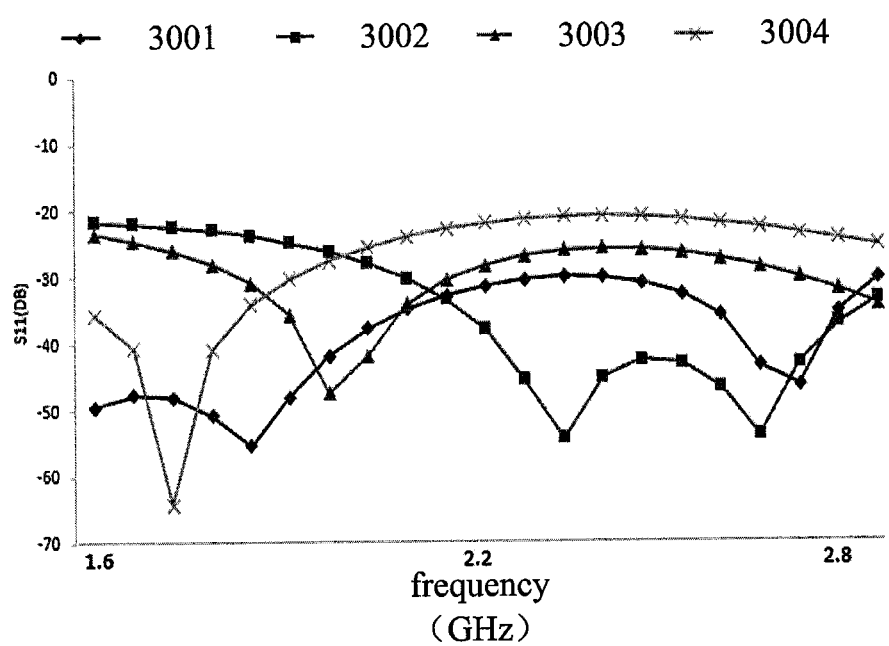
FIG. 15 is a schematic diagram showing the return loss of a radio frequency signal output by a phase shifter according to one or more exemplary embodiments of the present disclosure.

FIG. 15 is a schematic diagram of return loss (s11) in dB as a function of frequency (in GHz) when using the three types of dielectric boards shown in FIG. 11 to FIG. 13 in the phase shifter 200. The curve 3002 corresponds to the dielectric board 2053, the curve 3003 corresponds to the dielectric board 2054, and the curve 3004 corresponds to the dielectric board 2055. In addition, the curve 3001 shows the return loss of the RF signal output by the phase shifter 200 when no dielectric board is provided.

As can be seen from FIG. 15, the dielectric board in the phase shifter 200 does not introduce additional return loss.

Figure 19:
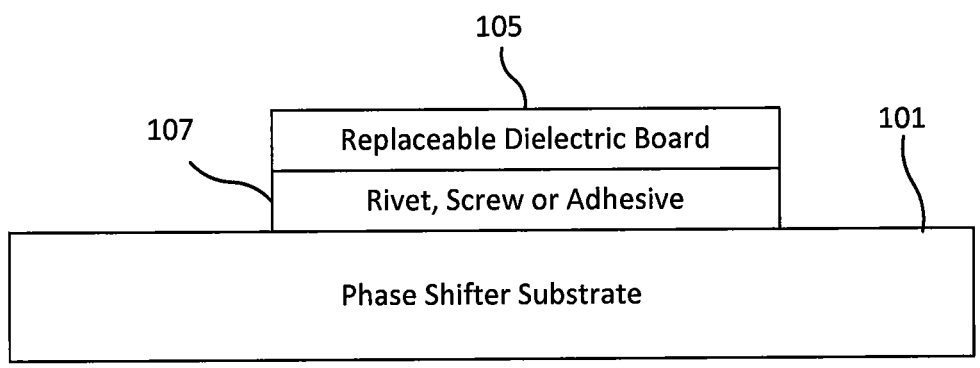
FIG. 19 is a schematic diagram showing that the dielectric board can be fixed to a substrate of a phase shifter by rivets, screwing or an adhesive.

In addition, in the embodiments according to the present disclosure, the dielectric board may be fixed to the substrate of the phase shifter in various ways. For example, in order to facilitate the replacement of different dielectric boards, the dielectric boards can be fixed by riveting or screwing. Alternatively, the dielectric board can be bonded to the phase shifter with an adhesive. This is schematically illustrated in the block diagram of FIG. 19, which shows that the dielectric board 105 is fixed to the substrate 101 of the phase shifter via rivets, screws or an adhesive 107.

In addition, as described above, the present disclosure further provided a method of changing the amount of electronic downtilt applied to an antenna beam generated by an array of radiating elements, the method comprising: replacing a first dielectric board of a phase shifter of the antenna with a second dielectric board. Usually, the phase shifter includes a microstrip transmission line segment that includes a feed line and a ground plane. In some embodiments of the present disclosure, the second dielectric board may be positioned over the feed line so that the feed line is between the dielectric board and the ground plane.

As described above, the first and second dielectric boards may have different dielectric constants, or the first and second dielectric boards may cover different lengths of a transmission line segment of the phase shifter, so that the amount of phase shift of RF signal by the phase shifter may be changed.

In addition, as shown in FIG. 7-FIG. 13, the first dielectric board may include a first trace segment (such as the feed line 206), and the second dielectric board may include a second trace segment (such as the feed line 2062) that has a different electrical length than the first trace segment. The first and second trace segments may be each configured to capacitively couple to a pair of transmission line segments (such as the feed line 2041, 2042) of the phase shifter.

When the first dielectric board is used, the feed line (the first transmission line) 2041 and the feed line 2042 (the second transmission line) are electrically connected to the two ends of the feed line 206 on the first dielectric board, respectively. When the first dielectric board is replaced by the second dielectric board in the phase shifter, the feed line (the first transmission line) 2041 and the feed line 2042 (the second transmission line) are electrically connected to the two ends of the feed line 2062 on the second dielectric board, respectively.

Figure 18:
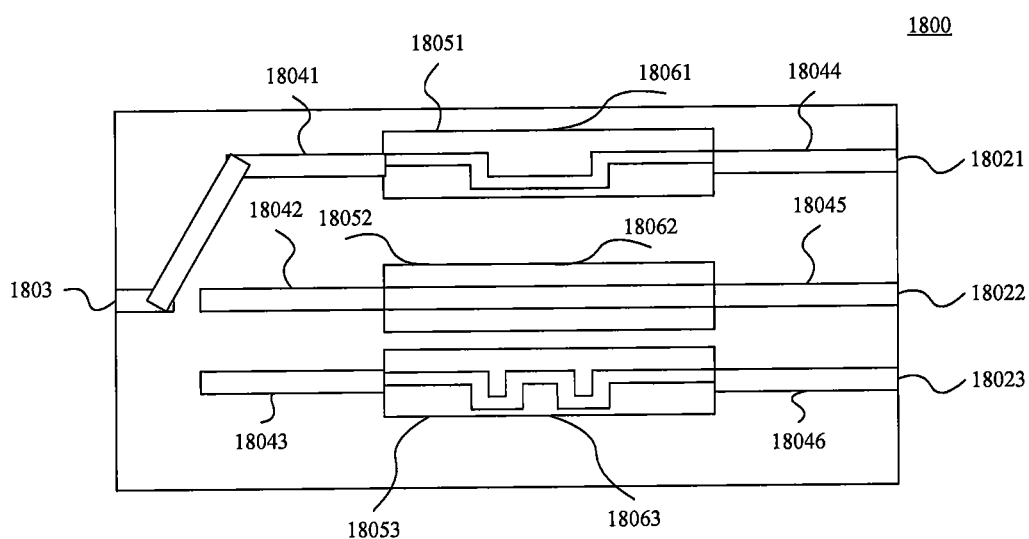
FIG. 18 is a schematic diagram of a phase shifter according to exemplary embodiments of the present disclosure.

FIG. 18 is a schematic diagram of a phase shifter according to exemplary embodiments of the present disclosure. The phase shifter 1800 has an input port 1803 and three output ports 18021, 18022 and 18023. Three feed lines 18041, 18042 and 18043 are connected to the input port 1803. Three feed lines 18044, 18045 and 18046 are connected to the three output ports 18021, 18022 and 18023, respectively. A dielectric board 18051 is provided between the feed line 18041 and 18044, a dielectric board 18052 is provided between the feed line 18042 and 18045, and a dielectric board 18053 is provided between the feed line 18043 and 18046. The dielectric board 18051, 18052 and 18053 have feed lines 18061, 18062 and 18063 of different shapes.

The RF signal is input into the phase shifter 1800 via the input port 1803. It may be selected to output the phase shifted RF signal from any one of the three output ports 18021, 18022 and 18023. In addition, as described above, by replacing one or more of the dielectric boards 18051, 18052 and 18053, the amount of phase shift of the RF signal output from the respective output ports of the phase shifter 1800 can be changed flexibly. In additional, it should be understood that the phase shifter according to the present disclosure may have any number of output ports, and is not limited to the above embodiments. For example, in an exemplary embodiment, a phase shifter may include five output ports; and in another exemplary embodiment, a phase shifter may include ten output ports.

The terms "before", "after", "top", "bottom", "above", "below", etc. in the specification and claims, if present, are for descriptive purpose and not necessarily used to describe an unchanged relative position. It will be understood that the terms are interchangeable in appropriate situations. The embodiments of the present disclosure described herein are, for example, capable of operating in orientation other than those shown or described herein.

As used in the present disclosure, the term "exemplary" means "serving as an example, instance, or illustration" rather than as a "model" to be precisely copied. Any embodiments exemplarily described herein are not necessarily to be construed as preferred or advantageous over other embodiments. Furthermore, the present disclosure is not limited by any of the stated or implied theory presented in the above technical field, the background, the summary or the detailed description of the embodiments.

As used herein, the term "substantially" is intended to include any minor variation resulting from a design or manufacturing defect, a device or component tolerance, environmental influence, and/or other factors. The term "substantially" also allows for deviation from perfect or ideal situations caused by parasitic effects, noise, and other practical considerations that may exist in actual implementations.

In addition, the foregoing description may refer to elements or nodes or features that are "connected" or "coupled" together. As used herein, "connect" means that an element/node/feature is directly connected electrically, mechanically, logically, or otherwise to (or directly communicate with) another element/node/feature, unless otherwise explicitly stated. Similarly, "couple" means that an element/node/feature may be mechanically, electrically, logically, or otherwise linked to another element/node/feature in a direct or indirect manner, unless explicitly stated otherwise to allow interaction, even if these two features may not be directly connected. That is, "couple" is intended to include both direct and indirect connection of elements or other features, and includes a connection with one or more intermediate elements.

In addition, the terms "first", "second", and the like may also be used herein for the purpose of reference only, and thus are not intended to be limiting. For example, the terms "first", "second", and other such numerical terms referring to the structure or element do not imply the sequence or order, unless specifically pointed out in the context.

It is also to be understood that the terms "comprise/include" herein means that the described features, steps, operations, units and/or components exist, but the existence or adding of one or more other features, steps, operations, units and/or components and/or combinations thereof are not excluded.

Those skilled in the art will appreciate that the boundaries between the above operations are merely illustrative. Multiple operations may be combined into a single operation, a single operation may be distributed among additional operations, and operations may be performed at least partially overlapping in time. Moreover, alternative embodiments may include multiple instances of a particular operation, and the operational sequence may be varied in other various embodiments. However, other modifications, changes, and substitutions are equally possible. Accordingly, the specification and drawings are to be regarded as illustrative rather than limiting.

While some specific embodiments of the present disclosure have been described in detail by way of example, a skilled person should be understood that the above examples are for illustrative purpose and have no intention to limit the scope of the present disclosure. The embodiments disclosed in the present disclosure may be combined in any manner without departing from the spirit and scope of the present disclosure. It will be understood by a person skilled in the art that various modifications may be made to the embodiments without departing from the scope and spirit of the present disclosure. The scope of the present disclosure is defined by the appended claims.

That which is claimed is:

1. A phase shifter, including
    an input port configured to receive a radio frequency (RF) signal;
    an output port configured to output the RF signal with a changed phase;
    a feed line configured to transmit the RF signal from the input port to the output port and change the phase of the RF signal; and
    a replaceable dielectric board made of a dielectric material and configured to cover at least a part of the feed line,
    wherein the phase shifter includes a substrate carrying the feed line, and the replaceable dielectric board is fixed to the substrate.

2. The phase shifter according to claim 1, wherein the phase shifter includes a plurality of replaceable dielectric boards, and different replaceable dielectric boards cover different amounts of the feed line.

3. The phase shifter of claim 2, wherein the dielectric materials of the plurality of replaceable dielectric boards have different respective dielectric constants.

4. The phase shifter of claim 2, wherein the plurality of replaceable dielectric boards have different thicknesses.

5. The phase shifter of claim 2, wherein the plurality of replaceable dielectric boards have different sizes.

6. The phase shifter of claim 1, wherein the replaceable dielectric board is fixed to the substrate by riveting or screwing.

7. A phase shifter, including:
a substrate;
an input port configured to receive a radio frequency (RF) signal;
an output port configured to output the RF signal with a changed phase;
a feed line on the substrate configured to transmit the RF signal from the input port to the output port and change the phase of the RF signal; and
a replaceable dielectric board which is made of a dielectric material and includes a first surface and a second surface opposite the first surface,
wherein the feed line includes a first feed line, a second feed line and a third feed line that are not physically connected to one another,
the second feed line is located on the second surface of the dielectric board, and the dielectric board is provided on the substrate so that the first surface of the dielectric board is adjacent to the first feed line and the third feed line, two ends of the second feed line are coupled to the first feed line and the third feed line, respectively.

8. The phase shifter of claim 7, wherein the dielectric materials of different ones of the replaceable dielectric boards have different respective dielectric constants.

9. The phase shifter according to claim 7, wherein the dielectric board is fixed to the substrate by riveting or screwing.

10. The phase shifter of claim 7, wherein the lengths of the second feed lines on different ones of the replaceable dielectric boards are different.

11. A method of fabricating a phase shifter, the method comprising:
providing a substrate that includes a main feed line on a first side of the substrate;
selecting a first dielectric board from among a plurality of dielectric boards that are configured to be mated with the substrate, where at least some of the dielectric boards in the plurality of dielectric boards are configured to provide different amounts of phase shift to radio frequency (RF) signals traversing the main feed line; and
mounting the first dielectric board on the substrate to at least partly cover the main feed line,
wherein the main feed line is a continuous main feed line, and wherein the plurality of dielectric boards have different dielectric constants, different thicknesses and/or are configured to cover different amounts of the main feed line.

12. The method of claim 11, wherein the substrate further includes a ground plane on a second side of the substrate, and wherein the first dielectric board is positioned over the main feed line so that the main feed line is between the first dielectric board and the ground plane.

13. A method of fabricating a phase shifter, the method comprising:
providing a substrate that includes a main feed line on a first side of the substrate;
selecting a first dielectric board from a plurality of dielectric boards that are configured to be mated with the substrate, where at least some of the dielectric boards in the plurality of dielectric boards are configured to provide different amounts of phase shift to radio frequency (RF) signals traversing the main feed line; and
mounting the first dielectric board on the substrate to at least partly cover the main feed line,
wherein the main feed line has a first segment and a second segment that is spaced apart from the first segment by a gap, and
wherein each of the plurality of dielectric boards includes a respective connecting feed line, wherein the connecting feed lines of at least some of the plurality of dielectric boards have a different electrical length.

14. The method of claim 13, wherein each of the connecting feed lines is configured to couple to both the first segment and the second segment of the main feed line when the dielectric board including the respective connecting feed line is mounted on the substrate.

15. The method of claim 14, wherein each connecting feed line is configured to capacitively couple to the first and second segments of the main feed line.

16. The method of claim 13, wherein at least two of the connecting feed lines have different physical lengths.

17. The method of claim 13, wherein at least two of the plurality of dielectric boards have different dielectric constants.

* * * * *